United States Patent Office 3,533,882
Patented Oct. 13, 1970

3,533,882
APPARATUS FOR WINDING MATERIAL SPIRALLY
Jerome W. Riese, Neenah, Wis., assignor to Kimberly-Clark Corporation, Neenah, Wis., a corporation of Delaware
Filed Oct. 10, 1967, Ser. No. 674,187
Int. Cl. B31c 13/00, 3/00, 11/00
U.S. Cl. 156—425     10 Claims

ABSTRACT OF THE DISCLOSURE

A machine for spirally winding flexible webs from rolls of said webs and onto a flat mandrel by means of web guides moving about the mandrel with the rolls and moving toward and away from the central axis of the mandrel while the rolls remain at fixed distances from the central axis of the mandrel, with the movement of the web guides toward and away from the mandrel axis being such that the velocity of the webs passing from the rolls remain constant.

---

The invention relates to apparatus for crosslaying flexible sheet material webs about a mandrel and more particularly to apparatus for forming a composite multi-ply web product in which the plies extend diagonally with respect to the longitudinal dimensions of the product.

It has previously been proposed in a copending patent application of which I am one of the joint inventors, Ser. No. 622,187, filed Mar. 10, 1967, and entitled "Apparatus for Crosslaying Flexible Webs," to utilize, in a web crosslaying apparatus, a mandrel which is substantially flat and an improved web guide apparatus so arranged that the velocity of the webs remains substantially constant as the webs are spirally wound onto the mandrel. This is accomplished by using web guides extending parallel with the axis of the mandrel and moving about the mandrel in a path in the form of an elongated loop with its major axis disposed at an acute angle with respect to the flat mandrel and a web roll provided for each of the web guides mounted on a carriage which moves toward and away from the central axis of the flat mandrel along with its web.

It is an object of the present invention to provide a still further improved apparatus of this general type in which the web rolls are mounted to move in paths which do not vary from circular and, in particular, which do not undulate toward and away from the central axis of the flat mandrel along with the web guides so that great forces for moving such rolls, if these rolls are quite large and heavy, are not required.

The invention consists of the novel constructions, arrangements and devices to be hereinafter described and claimed for carrying out the above stated objects, and such other objects, as will be apparent from the following description of preferred forms of the invention, illustrated with reference to the accompanying drawings, wherein:

FIG. 3 is a side elevational view of the flat central mandrel;

FIG. 4 is an end elevational view of the mandrel;

Figure 1:
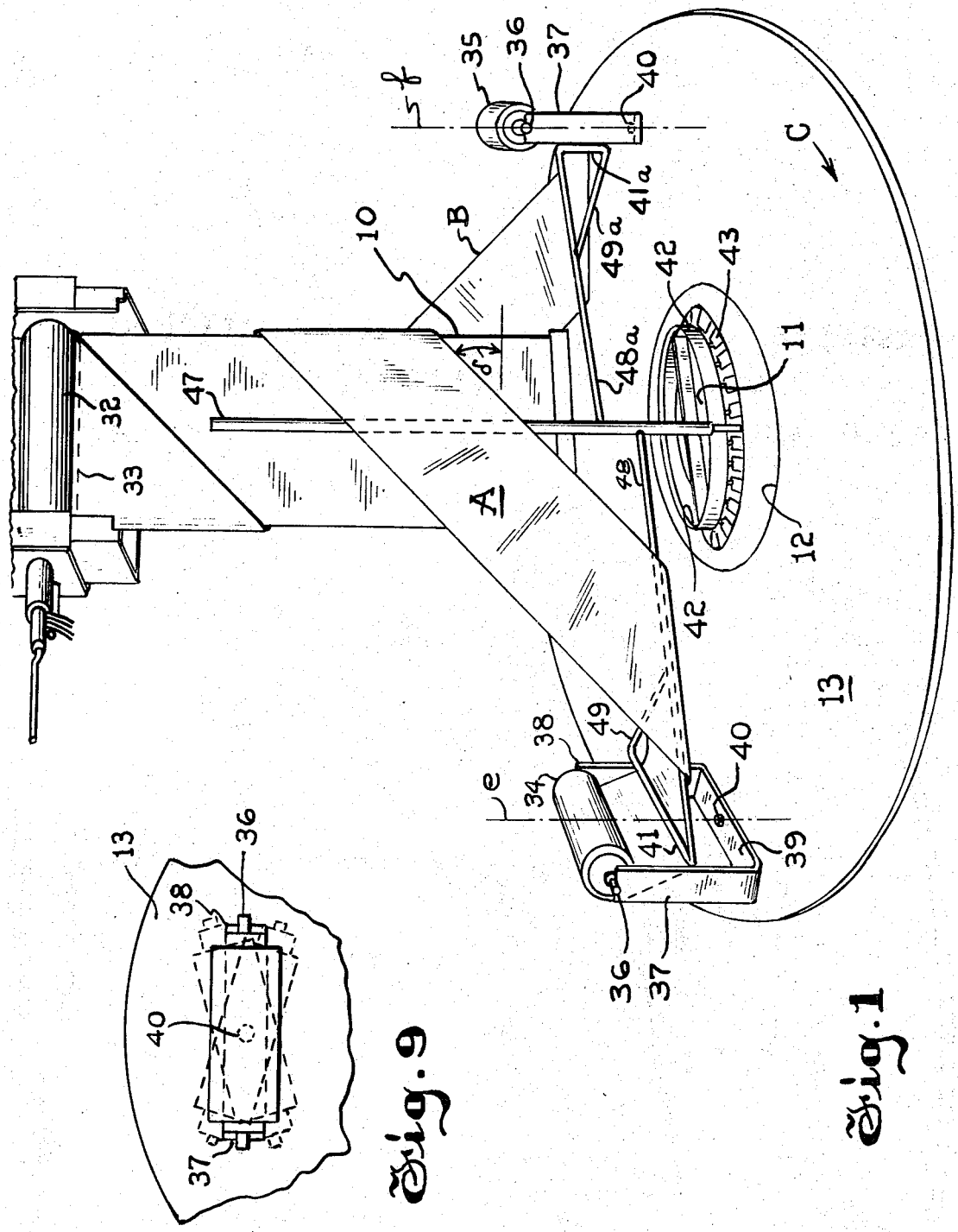
FIG. 1 is a perspective view of a crosslaying apparatus embodying the principles of the invention and including a vertical flat central mandrel about which webs of flexible sheet material are wound from supply rolls of the sheet material and including vertical web guides that move about the mandrel in a path that is controlled by means of a cam extending about the mandrel.
Figure 2:
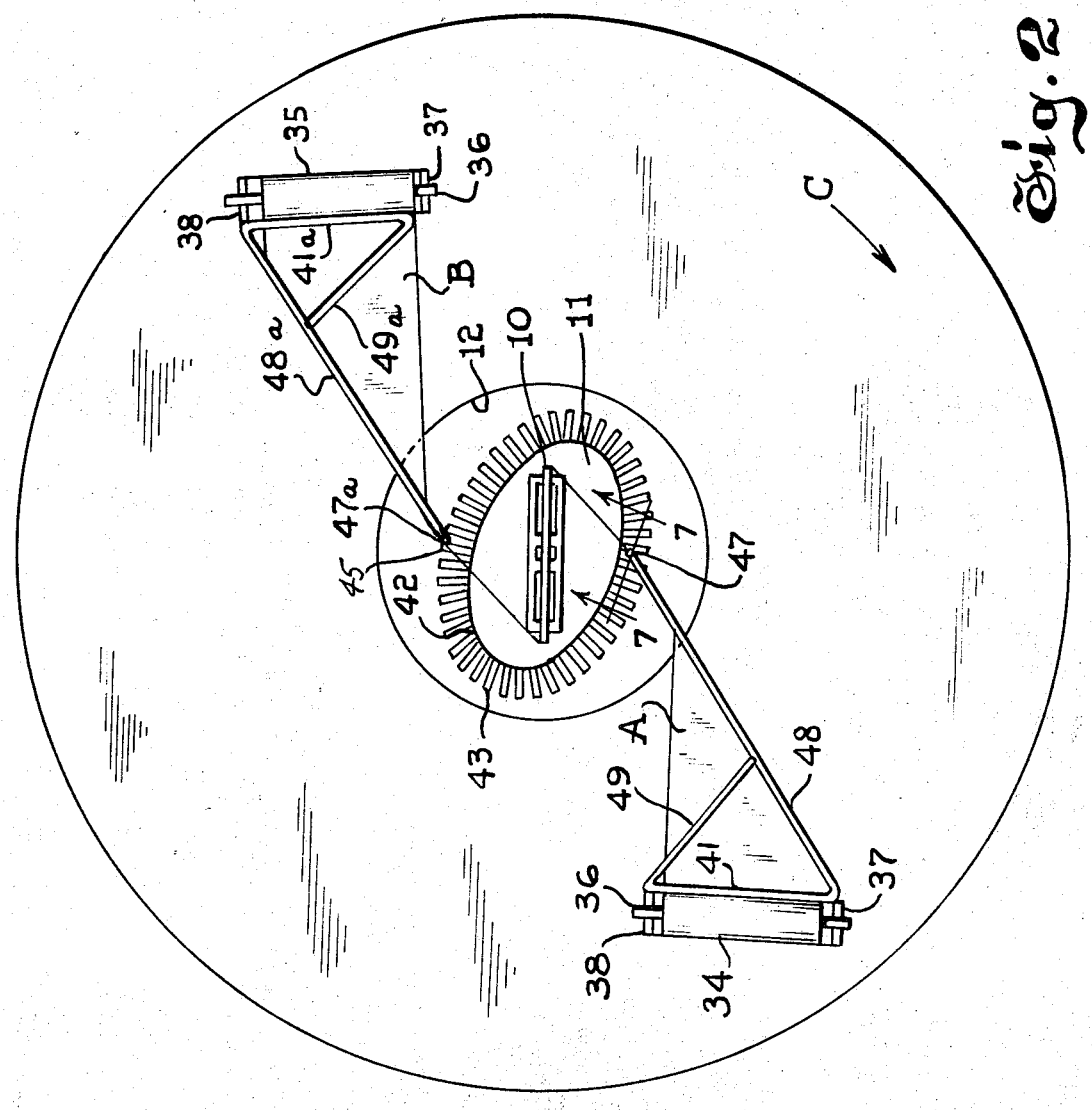
FIG. 2 is a top plan view of the crosslaying apparatus.
Figure 7:
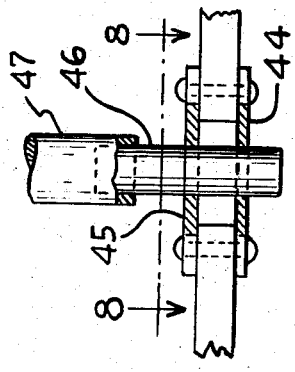
Figure 8:
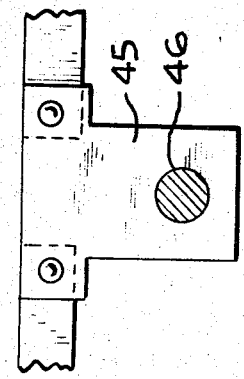
Figure 9:
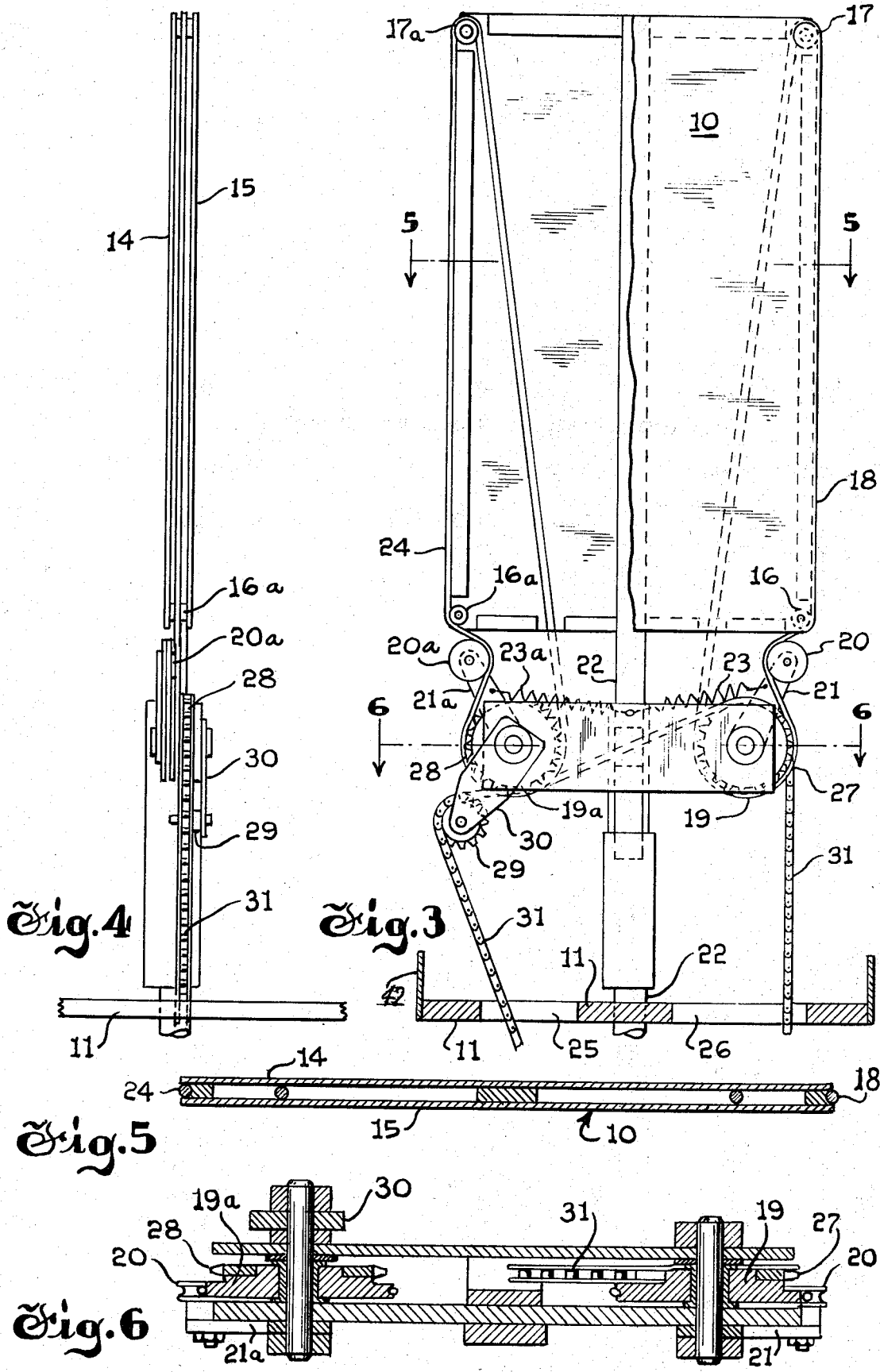
Figure 10:
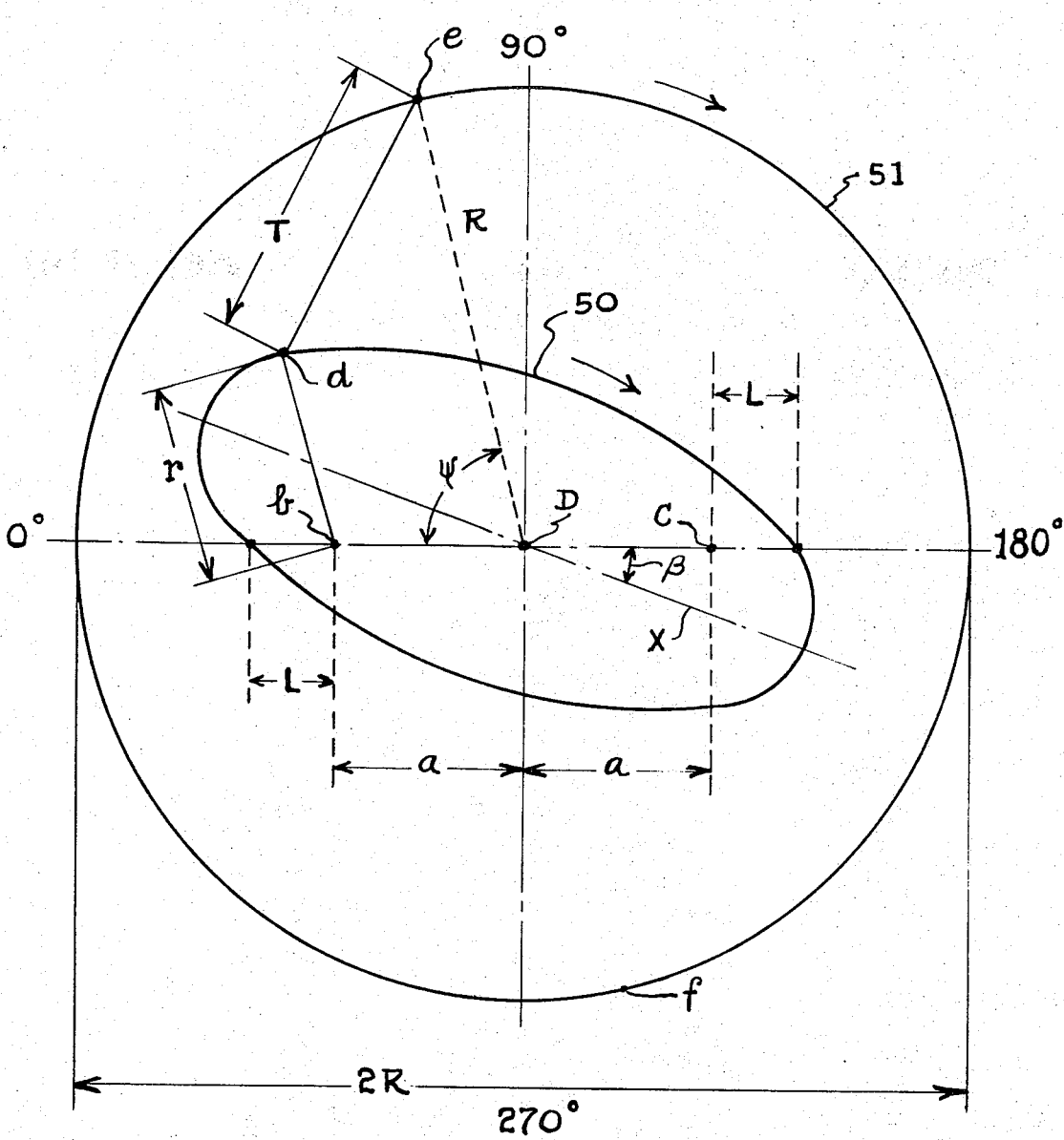
Figure 11:
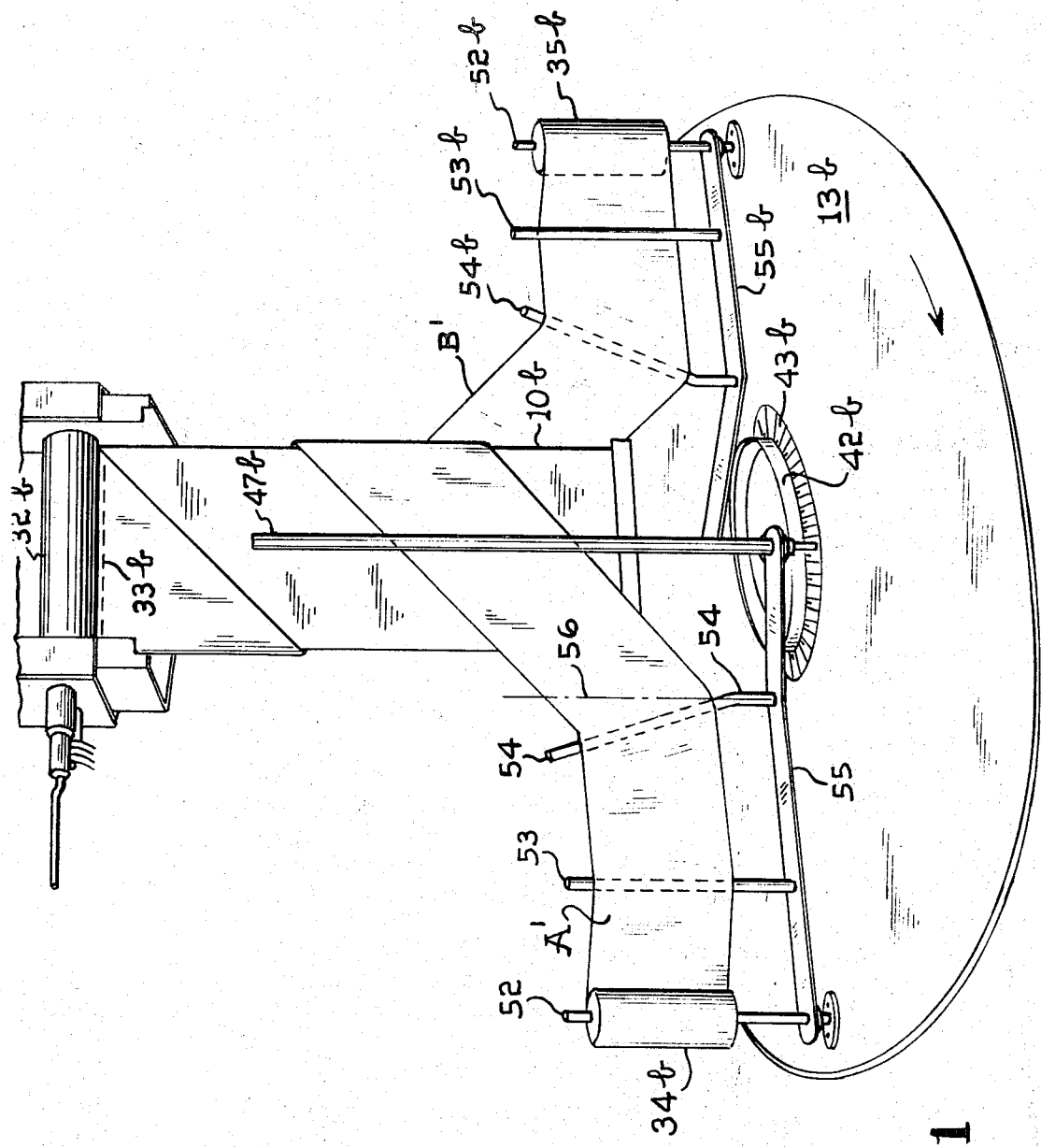
Figure 12:
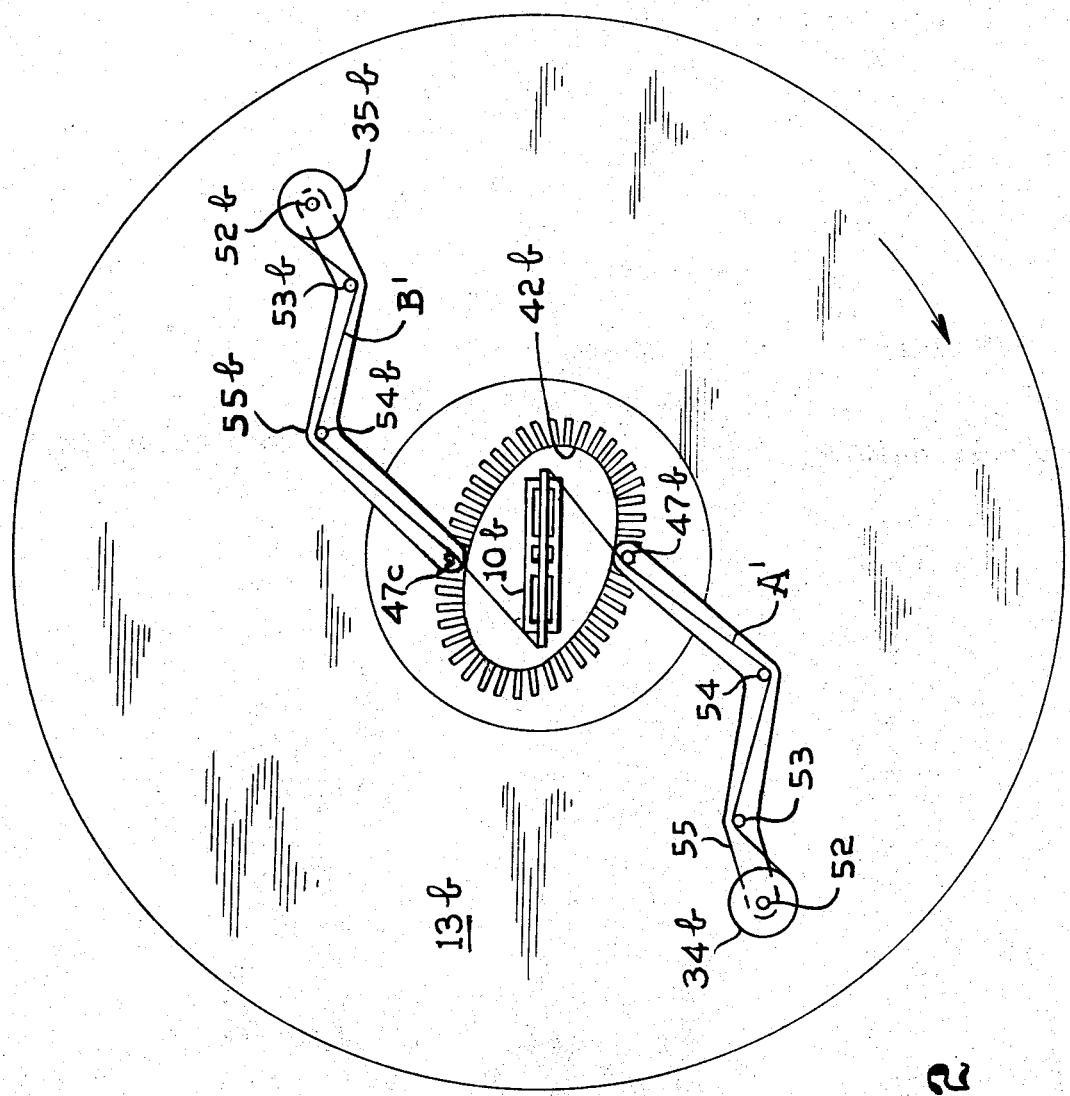

FIGS. 5 and 6 are sectional views on an enlarged scale taken on lines 5—5 and 6—6 respectively of FIG. 3;

FIG. 7 is a sectional view on an enlarged scale taken on line 7—7 of FIG. 2;

FIG. 8 is a sectional view taken on line 8—8 of FIG. 7;

FIG. 9 is a top plan view of one of the supply rolls of flexible sheet material illustrated in FIG. 1;

FIG. 10 is a diagram showing the paths of travel of the supply rolls of flexible sheet material and also of the vertical web guides;

FIG. 11 is a perspective view of a modified form of the crosslaying apparatus of the invention; and, FIG. 12 is a top plan view of the crosslaying apparatus as shown in FIG. 11.

Like characters of reference designate like parts in the several views.

Referring now to the drawings, the crosslaying apparatus as seen in FIGS. 1 to 9, may be seen to comprise a mandrel 10 which extends upwardly through a flat stationary table portion 11. The table portion 11 is disposed within an internal circular opening 12 provided in an annular rotatable table 13. Any suitable means (not shown) may be used for drivingly rotating the table.

The mandrel 10 comprises a pair of spaced plates 14 and 15 which are suitably connected and braced with respect to each other. A pair of rollers 16 and 17 are provided between the plates 14 and 15 at the lower and upper edges of the plates, and a belt 18 extends between the rollers 16 and 17. A drive roll 19 is provided below the mandrel 10; and the belt 18, as will be observed from FIG. 3, extends around the rollers 16 and 17 and the roll 19. A takeup roll 20 is provided to be effective on the belt 18 between the roll 19 and the roller 16, and the takeup roll 20 is carried by a swing arm 21 rotatably disposed about the center of rotation of the roll 19. The mandrel 10 is supported by means of a shaft 22 which extends through the table portion 11, and a spring 23 is provided between the shaft 22 and the arm 21 for the purpose of pulling the roll 20 toward the shaft 22 to maintain the belt 18 under tension about the roll 19 and the rolls 16 and 17.

A belt 24 is disposed about rollers 16a and 17a and rolls 19a and 20a corresponding to the parts 16, 17, 19 and 20 described in connection with the belt 18. The roll 20a is disposed on a swing arm 21a which is acted on by a spring 23a, and these parts correspond to the parts 20, 21 and 23 previously described. A pair of slots 25 and 26 are provided in the table portion 11, located opposite to each other with respect to the opening in the table portion 11 for receiving the shaft 22. A drive sprocket 27 is mounted coaxially with and is fixed with respect to the roll 19, and a drive sprocket 28 is mounted coaxially with and is fixed with respect to the roll 19a. An idler sprocket 29 is mounted on an arm 30 depending downwardly from the center of rotation of the roll 19a, and a drive chain 31 extends through the slots 25 and 26 and around the sprockets 27, 28 and 29 for the purpose of driving the rolls 19 and 19a and for thereby driving the belts 18 and 24 so that they move upwardly on the side edges of the mandrel 10. The chain 31 is driven from any suitable drive mechanism (not shown) located below the table 13.

A pair of calender rolls 32 and 33 are disposed above the mandrel 10 and have a nip substantially aligned with but slightly spaced from the upper end of the mandrel 10. The rolls 32 and 33 are driven from any suitable source of motive power and at the same uniform peripheral speed as the speed of upward movement of the belts 18 and 24 at the side edges of the mandrel 10 so as to tend to pull webs which have been wound onto the mandrel 10 upwardly through the nip of the rolls 32 and 33. At least one of the rolls 32 and 33 is preferably heated, and each of the webs that travels upwardly on the mandrel 10 either has fibers in it that are of a thermoplastic material or else has other thermoplastic material, such as powder, in it. The heated roll causes the contacting faces of the webs, as they travel off the upper end of the mandrel 10, to adhere to each other due to fusing of the thermoplastic material so as to form a composite laminated flat web in which the longitudinal fibers of each component web extend at acute angles with respect to the longitudinal dimension of the finished product, with the component webs being spirally wound onto the mandrel 10 as will hereinafter be described in greater detail.

A pair of supply rolls 34 and 35 of thermoplastic sheet material, or other web material, which it is desired to spirally wind onto the mandrel 10, are disposed on the rotatable table 13. Each of the rolls 34 and 35 has a core shaft 36 extending through it, and the shaft 36 for each of the rolls is supported horizontally on the table 13 by means of a pair of standards 37 and 38 which are fixed to the ends of a bridging part 39 resting flatly on the table 13. A stud 40 extends through the part 39 at its center and also through the table 13 for the purpose of swingably mounting the respective roll 34 or 35 on the table 13 through a vertical line passing midway between the ends of the roll 34 or 35. A guide bar 41 for the roll 34 and a guide bar 41a for the roll 35 are fixed to and between the standards 37 and 38 for the respective rolls 34 and 35 so as to be parallel with the table 13 and with the longitudinal centers of respective roll support shafts 36 whereby to act as guides for a web A being drawn off of the roll 34 and for a web B being drawn off of the roll 35.

An oval shaped sheet metal cam 42 extends upwardly from and is fixed with respect to the edges of the table portion 11, and an endless articulated chain 43 is movably disposed about the external surface of the cam 42. The endless chain 43 has a pair of outwardly extending vertically spaced lugs 44 and 45, and a shaft 46 extends through openings in these lugs so that the shaft 46 is held vertically. An elongate sleeve 47 fits over the shaft 46, and the sleeve 47 is thereby held vertically disposed. A sidewardly extending shaft 48 is fixed at one end to the sleeve 47 and is fixed at its other end to one end of the guide bar 41. A bracing bar 49 is fixed to the other end of the guide bar 41 and is fixed to the shaft 48 at a place intermediate the ends of the shaft 48. The shaft 48, the sleeve 47, the guide bar 41 and the bracing bar 49 thus act as an integral piece; and, since the bar 41 is fixed with respect to the standards 37 and 38 for the roll 34, the roll 34 likewise has its longitudinal center fixed with respect to the shaft 48, sleeve 47, and bars 41 and 49.

The guide bar 41a and the standards 37 and 38 for the roll 35 are fixed with respect to a bracing bar 49a, a shaft 48a and a sleeve 47a in the same manner as the parts 49, 48 and 47 are fixed together. The sleeve 47a is connected to the chain 43 in the same manner as the sleeve 47 is connected to the chain utilizing a shaft corresponding to the shaft 46, and this connection is just opposite or at 180° with respect to the shaft 46 about the longitudinal center of the mandrel 10.

In operation, the table 13 is drivingly rotated in the direction indicated by the arrow C, and the web A passes from the roll 34 under the guide bar 41, around the shaft 48, around the sleeve 47 and onto the mandrel 10 to thus be wound onto the mandrel. The web B is likewise wound onto the mandrel 10, passing from the roll 35, under the guide bar 41a, around the shaft 48a, around the sleeve 47a and onto the mandrel 10. The belts 18 and 24 move upwardly along the edges of the mandrel 10 and the calender rolls 32 and 33 are rotatably driven, so that the webs A and B are helically wound around the mandrel 10, with the edges of the webs A and B slightly overlapping, and travel upwardly on the mandrel. The webs A and B pass off the upper end of the mandrel 10 and between the calender rolls 32 and 33 so that the portions of the webs on the opposite faces of the mandrel 10 are brought together; and, assuming that the webs A and B have thermoplastic material in them and one of the rolls 32 and 33 is heated, the opposite sides of the webs A and B are thereby thermoplastically fixed together so as to form a composite two-ply web product.

As has been hereinbefore explained, each of the web rolls 34 and 35 is swingably mounted on the table 13 about an axis that passes through the center of gravity of the rolls 34 and 35; and it is not necessary to move the rolls 34 and 35, which may be rather heavy, inwardly and outwardly with respect to the center of the mandrel 10 and the center of rotation of the table 13 as the winding is done. The sleeve 47 simply trails the roll 34 and the sleeve 47a likewise trails the roll 35, both being simply dragged along with corresponding movement of the chain 43 about the cam 42 as the rolls 34 and 35 move at uniform speed around the center of the mandrel 10 and center of rotation of the table 13. The cam 42 is so shaped that the sleeves 47 and 47a move inwardly and outwardly with respect to the longitudinal center of the mandrel 10 so that the webs A and B travel from their rolls 34 and 35 and around the sleeve 47 and 47a at a constant speed and so that the angle of the webs A and B into the vertical from the sleeves 47 and 47a to the side edges of the mandrel 10 remains constant, assuming that, as is the case, the webs A and B helically wound onto the mandrel 10 travel upwardly on the mandrel 10 at a uniform speed due to the uniform speed of the belts 18 and 24 and the uniform speeds of the calender rolls 32 and 33.

With the above described construction in which the parts 47, 48, 41 and 49 are all fixed with respect to each other and with respect to the shaft 36 of the web roll so as together to constitute a carriage, and in which the parts 47a, 48a, 41a and 49a have a similar relation with respect to the web roll 35 and to each other to form another carriage and in which the web rolls 34 and 35 are swingably mounted with respect to the rotatable table 13 by means of the studs 40 on fixed vertical axes that extend through the center of gravity of the rolls 34 and 35; there are two principal locations on these carriages that are important, namely, (1) the vertical axes passing through the centers of gravity of the rolls 34 and 35 provided by the studs 40, and (2) the vertical lines at which the webs A and B leave these carriages which are the longitudinal centers of the sleeves 47 and 47a.

Referring particularly to FIG. 10, which shows a path 50 having the shape of the path of the longitudinal centers of the sleeves 47 and 47a caused by the chain 43 traveling about the cam 42, the dimension $a$ indicates one-half the width of the mandrel 10, the edges of which are indicated by the points $b$ and $c$ looking downwardly on the top end of the mandrel 10 as in FIG. 2. The point $d$ indicates the longitudinal center or axis of the sleeve 47, and the point $d$ travels around the path 50 in the clockwise direction. The point $e$ indicates a vertical center line through the center of gravity of the roll 34 and lies on a circle 51 defined by a radius R rotating about the center D of the mandrel 10. The diameter of the circle on which the point $e$ travels is, of course, 2R, as shown. The distance between points $d$ and $e$ is indicated by the fixed length vector T. The distance between the point $b$ and the path 50, as well as the distance from the point $c$ to the path 50, both measured on the major (0°–180°) axis of the mandrel 10, are indicated by the quantities L. The distance from the point $b$ to the point $d$, as the point $d$ travels clockwise around the path 50, is indicated by the vector $r$. It will be observed that the path 50 is an oval, and the oval has a major axis X which is at an angle $\beta$ with respect to the major axis of the mandrel 10 extending between the points $b$ and $c$.

The roll 35 is located on a vertical axis $f$ which also travels around the circle 51 at the radius R, and the path of travel of the web guide sleeve 47a for the web B is also defined by the path 50. If any additional rolls similar to the rolls 34 and 35 are provided in the apparatus, which is contemplated, the rolls will travel around the large circle 51 at the radius R along with the rolls 34 and 35; and the corresponding web guide sleeves corresponding to the sleeve 47 travel about the path 50 and trail their respective web supply rolls. In each case, the web supply rolls are all equidistantly located about the large circle 51; and, in the illustrated case, the rolls 34 and 35 are located at 180° from each other as are their web guide sleeves 47 and 47a. For purposes of simplicity, the FIG. 10 diagram shows only the axis $d$ and associated quantities and vectors.

In connection with the path 50 and the above described winding construction, I consider it desirable to meet three criteria. The three criteria are: First, because each of the web rolls 34 and 35 may be quite massive and heavy, I consider it desirable to simplify the motion of the vertical center lines passing through the centers of gravity of the rolls 34 and 35, and this has been done by swingably mounting the rolls 34 and 35 on the vertical lines $e$ and $f$ traveling around the circle 51 at the fixed distance R from the longitudinal center D of the mandrel 10. The rolls 34 and 35 are swingably fixed by means of the studs 40 so that these rolls at their centers of gravity have uniform circular motion at constant velocity; and the rolls 34 and 35, insofar as their centers of gravity are concerned, thus do not undulate as the table 13 rotates, that is, they do not move at their centers of gravity toward and away from the center of rotation of the table 13 and the center of the mandrel 10.

Secondly, since the carriage for each of the rolls 34 and 35, including the standards 37 and 38, the bridging part 39, and the bars 41, 48 and 49 for the roll 34, for example, is integral or constitutes one solid object, the distance connecting the vertical lines $e$ and $f$ through the centers of gravity of the rolls 34 and 35 with the longitudinal centers of the sleeves 47 and 47a respectively should desirably be and are constant. This distance for the roll 34 is indicated on the FIG. 10 diagram as the constant length vector T.

Thirdly, the distance between the point $d$ on the FIG. 10 diagram which represents the longitudinal center line of the sleeve 47 and an edge of the mandrel represented by point $b$ on the diagram, which are respectively the places where the sheet departs the carriage of the roll 34, and the place where the sheet reaches the mandrel edge, should desirably be of a length $r$ which increases at a steady rate. The same criterion would exist for all other web supply rolls used, including the roll 35, and the same criterion exists for a radius drawn from the point $c$ representing the following 180° of travel of the roll 34. This third criterion occurs for two reasons, namely (1) so that the roll 34 (or the roll 35) will unwind at a steady rate having no disturbing jerks in its rotation, and (2) so that the angle of the web into the vertical (shown as the angle $\delta$ in FIG. 1) from the point $d$ representing the longitudinal center line of the sleeve 47 to the point $b$ representing the side edge of the mandrel 10 to which the sheet extends, remains constant, whereby the web is applied onto the mandrel 10 at the same rate of speed as the sheets move up the mandrel and the helical wind on the mandrel is constant.

Since each roll 34 and 35 is moving at a constant velocity around a circle 51 with rotation of the table 13, the above-mentioned requirement that the quantity $r$ increase with time at a constant rate may be translated into the purely geometrical (time-independent) requirement that $r$ increase proportional to the distance that the vertical line $e$ through the center of gravity of the roll 34 moves about its circle 51. This geometrical requirement may be met by choice of the proper path for the point $d$ which represents the longitudinal center line of the sleeve 47.

When the longitudinal center of the sleeve 47 represented by point $d$ in the FIG. 10 diagram passes through an extension of a plane passing between the side edges of the mandrel 10 represented by line $b-c$ in the FIG. 10 diagram, the point $d$ is spaced from the point $b$ by some clearance distance L. At this time, from the principles of trigonometry, the angle $\psi$, which is the angle between the line $b-c$ and a line $D-e$ as seen in FIG. 10, which is from the longitudinal center D of the mandrel 10 to the line $e$ passing through the center of gravity of the roll 34, takes the value $\psi_0$ determined by:

$$\cos \psi_0 = \frac{(a+L)^2 + R^2 - T^2}{2R(a+L)} \quad (1)$$

When $\psi$ has increased by 180° (to the value of $\psi_0 + 180°$), the distance $r$ measured from point $b$ to new point $d$ will have increased from L to $(2a+L)$, since $r$ must now extend across the mandrel $(2a)$ to a clearance L beyond point $c$; thus, the total increase in $r$ will be just $2a$, while $\psi$ increases 180°. At every intermediate angle $\psi$, the extension of $r$ must be just proportional to the distance traveled by point $e$ or the vertical center line of the roll 34 and to the increase of $\psi$ over $\psi_0$. Therefore, the relationship given below follows:

$$r = L + 2a\left(\frac{\psi - \psi_0}{180°}\right) \quad (2)$$

and this equation applies over the range of $\psi$ measured in degrees from $\psi_0$ to $(\psi_0 + 180°)$.

Since the distances R, T, $a$ and L may be fixed as desired and $\psi_0$ and $r$ may be calculated, the path 50 for $d$, that is, the path for the longitudinal center of the sleeve 47, can be determined as follows. The starting angle $\psi_0$ may be calculated from Equation 1, as set forth above; and the corresponding point $d$ on the path 50 is simply in line with the points $b$ and $c$ on the FIG. 10 diagram for a distance L to the left beyond the point $b$. Further points on the path 50 for points $d$ and the longitudinal center of the sleeve 47 may now be determined by (1): Selecting an angle $\psi$ between $\psi_0$ and $\psi_0 + 180°$; (2) Selecting the point $e$ as being on the large circle 51 at the chosen angle and striking an arc of length T about $e$ as the center; and (3) Striking an arc of length $r$ about the point $b$ as a center, with the quantity $r$ being determined by inserting the chosen angle $\psi$ into Equation 2 set forth above. The intersection of these two arcs for the various angles $\psi$ between 0° to 180° will indicate the path 50 for 0° to 180°. The remaining one-half path (180° to 360°) may be determined by repeating this procedure about the point $c$ instead of the point $b$, or simply by rotating the one-half path from 0 to 180° as determined above, for 180° about center D and recopying the path.

In brief, therefore, I have suggested that each of the web rolls 34 and 35 be driven at a constant radius R from the longitudinal center D of the mandrel 10 in uniform circular motion in the circle 51, with the rolls being free to pivot, as about the studs 40, with respect to the table 13 on which the rolls are mounted. I have further suggested that the guide sleeves 47 and 47a, which are fixed with respect to the centers of their respective rolls 34 and 35 whereby the guide sleeves pivot about the studs 40 along with the rolls, follow or trail the rolls 34 and 35 in the path 50 so that these sleeves 47 and 47a move toward and away from the center D of the mandrel 10 as determined by the path 50. With the path 50 being determined as above mentioned, by striking arcs, the webs A and B will be wound in a uniform spiral at a uniform angle $\delta$ (see FIG. 1) onto the mandrel 10 with the webs having a uniform velocity upwardly on the mandrel equal to the upward component of web movement on the guide sleeves 47 and 47a, and the webs will be drawn at uniform velocities off the rolls 34 and 35 so that there are no disturbing jerks in the webs for each revolution of the table 13. The cam 42, incidentally, has the same shape as the path 50 for the points $d$ but is less in radial dimension by the distance between the longitudinal center of the shaft 46 and the inner surfaces of the chain 43 riding on the outer surface of the cam 42, since the chain holds the shaft 46 spaced from the outer surface of the cam 42 for this distance.

In the embodiment of the invention illustrated in FIGS. 11 and 12, the web roll 34b, corresponding to the roll 34 in the first described embodiment, is vertically mounted on the table 13b instead of being horizontally mounted thereon; and such mounting may be by means of a vertical standard 52 fixed on the table 13b. A vertical guide bar 53 and a guide bar 54 that is slanted somewhat from vertical are provided for guiding the web A' from the roll 34b onto the guide sleeve 47b that is carried by the chain 43b moving about the cam 42b. The guide bars 53 and 54 are fixed onto a link 55 through which the standard 52 and sleeve 47b loosely extend and which is held from dropping down on the standard 52 and sleeve 47b by any suitable stop means fixed on the exterior surfaces of the standard 52 and sleeve 47b. Assuming that the web A' is wound onto the mandrel 10b at 45° with respect to the longitudinal center of the mandrel 10b, the web guiding upper portion of the bar 54 will extend at one-half this angle or at 22½° with respect to a vertical center line 56 passing through the lower or base portion of the bar 54. The parts 10b, 13b, 32b, 33b, 42b, 43b and 47b correspond with and are of the same construction as the parts 10, 13, 32, 33, 42, 43 and 47 in the first described embodiment.

Other supply rolls, such as the roll 35b, may be similarly mounted on the table 13b as illustrated in FIGS. 11 and 12. The roll 35b is mounted on a vertical standard 52b fixed on the table 13b, and a link 55b connects the sleeve 47c with the standard 52b and has the guide bars 53b and 54b, corresponding to the bars 53 and 54, fixed thereon. Both of the standards 52 and 52b are mounted on a radius R with respect to the longitudinal center of the mandrel 10b, and the FIG. 10 diagram applies also to this embodiment of the invention, with the points e and f in this case indicating the vertical longitudinal centers of the standards 52 and 52b respectively. The table 13 is rotated in the clockwise direction as seen in top plan view FIG. 12 as with the previously described embodiments; the rolls 34b and 35b rotate with their longitudinal centers on the circle 51; the web guide sleeve 47b and the web guide sleeve 47c are pulled along by and trail respectively the standards 52 and 52b, with the bars 55 and 55b corresponding respectively to the carriages connecting the rolls 34 and 35 with the web guide sleeves 47 and 47a in the previously described embodiment; and, the web guide sleeves 47b and 47c are supported by the chain 43b and travel around the periphery of the cam 42b in the embodiment shown in FIGS. 11 and 12. The web A' and the web B' as well as webs from any other rolls similar to the rolls 34b and 35b provided on the table 13b in vertical position along with the rolls 34b and 35b are thus spirally wound onto the mandrel 10b substantially under the same conditions as the webs are wound onto the mandrel 10 in the first described embodiment, namely, with the vertical velocity of the webs as they leave the guide sleeves 47b and 47c being equal to the velocity with which the webs are drawn off the mandrel 10b from the top of the mandrel and with the linear velocity of each of the webs as it is drawn off of its supply roll 34b, 35b, etc., being substantially constant.

Although both of the embodiments of the invention have been described as having the mandrel 10 or 10b vertically disposed, it will be apparent that the mandrel 10 or 10b can instead be horizontally disposed; and the table 13 or 13b in this case may be rotatably disposed on a horizontal axis which coincides with the horizontal axis of the mandrel 10 or 10b. In this case, in connection with the second described embodiment, it will be extremely easy to position the replacement web supply rolls 34b and 35b onto their standards 52 and 52b which extend horizontally, since each of the replacement rolls may simply be moved horizontally in order to put them into proper position.

It wish it to be understood that the invention is not to be limited to the specific constructions, arrangements and devices shown and described, except only insofar as the claims may be so limited, as it will be understood to those skilled in the art that changes may be made without departing from the principles of the invention. In particular, I wish it to be understood that, although I illustrate the flat mandrels 10 and 10b about which the webs are wound; in lieu of these flat mandrels, two opposite parallel rods or bars can be utilized which correspond to the side edges of the mandrels. I wish it to be understood also that, although I illustrate the winding of webs about the mandrels, threads could, instead, be utilized in lieu of the webs with the same advantageous results. Also, it is to be understood that the foregoing abstract of the disclosure shall not be used for interpreting the scope of the claims.

I claim:

1. Winding apparatus comprising a mandrel of non-round cross section having a central axis, rotatable means for holding a supply roll of a continuous length of material to be wound about the mandrel and including means for constraining the roll to move about the mandrel on a fixed radius with respect to the central axis of the mandrel, a guide for guiding said material onto said mandrel from said supply roll, means for moving said guide about said mandrel in a path in which the guide moves toward and away from the central axis of the mandrel as the supply roll moves about the mandrel so that said material is taken from said supply roll at a substantially constant rate, and means for drawing off the web from the mandrel at a constant rate.

2. Winding apparatus as set forth in claim 1, said mandrel comprising two parallel spaced straight edges and said guide moving means holding said guide parallel with said mandrel straight edges as it moves about said mandrel and moving the guide in a path constituting an elongated loop.

3. Winding apparatus as set forth in claim 2, said guide moving means including a fixed length linkage connecting said guide and said supply roll so that the supply roll and guide move together and a cam for determining the path of said guide as said guide and supply roll move.

4. Winding apparatus as set forth in claim 3, means for drivingly moving said supply roll, said linkage connecting said guide and said supply roll and said cam being so arranged that the guide trails and is drawn along with the supply roll as the supply roll moves in its circular orbit and the guide travels around said cam.

5. Winding apparatus as set forth in claim 2, said roll holding means including a pair of standards extending parallel with said mandrel straight edges and holding the axis of said roll in a plane which is perpendicular to the central axis of the mandrel and said linkage providing additional straight edges around which the web from said supply roll is drawn to said guide so as to change its dierction whereby the transverse dimension of the web is parallel with said mandrel straight edges as it is wound onto the mandrel straight edges.

6. Winding apparatus as set forth in claim 2, said supply roll holding means including a shaft extending parallel with said straight edges for mounting the roll thereon so that its central axis extends parallel with said straight edges.

7. Winding apparatus as set forth in claim 6, said guide moving means including a fixed length linkage connecting said guide and said supply roll so that the supply roll and guide move together and said linkage carrying an additional straight edge around which the web from said supply roll passes and which extends at an acute angle with respect to the axis of the supply roll so as to change the direction of movement of the web from the supply roll whereby it winds helically onto the mandrel as the supply roll and guide move.

8. Winding apparatus as set forth in claim 3, means for drawing off the web wound onto said straight edges from the ends of the straight edges, said linkage including at least one additional straight edge which extends at an acute angle with respect to the axis of said supply roll so as to apply the web onto said guide and onto said first named straight edges at acute angles whereby the web travels helically along said first named straight edges.

9. Winding apparatus as set forth in claim 1, said guide moving means including a fixed length linkage connecting said guide and said supply roll so that the supply roll and guide move together and said mandrel comprising two spaced straight edges, said guide path in cross section being the point of intersection of an arc from said supply roll equal to said fixed length and a variable radius described from one of said straight edges which increases linearly with respect to the movement of said supply roll about the central axis of the mandrel.

10. Winding apparatus as set forth in claim 9, said variable radius being defined by the equation:

$$r = L + 2a\left(\frac{\Psi - \Psi_0}{180°}\right)$$

wherein $\psi_0$ is defined by the equation:

$$\cos \Psi_0 = \frac{(a+L)^2 + R^2 - T^2}{2R(a+L)}$$

with $2a$ being the distance between said straight edges of said mandrel, L is the distance between one of said straight edges and said guide as the guide passes through a line defined by said two straight edges in cross section, R is the radius of movement of said supply roll, T is the fixed length of said linkage, $\psi_0$ is the angle between a line passing through said straight edges and a line passing from the longitudinal center of the mandrel to said supply roll when said guide is on the line between said straight edges and $\psi$ is the angle measured from the longitudinal center of the mandrel to said supply roll as the supply roll continues its movement.

References Cited

UNITED STATES PATENTS 2,814,329  11/1957  Sitton _____ 156—188
3,189,501  6/1959  White _____ 156—189

BENJAMIN A. BORCHELT, Primary Examiner

THOMAS H. WEBB, Assistant Examiner

U.S. Cl. X.R.

156—189